Jan. 11, 1938.  C. J. STREETER  2,104,912
FILING AND STACKING EQUIPMENT
Filed April 19, 1935   5 Sheets-Sheet 3
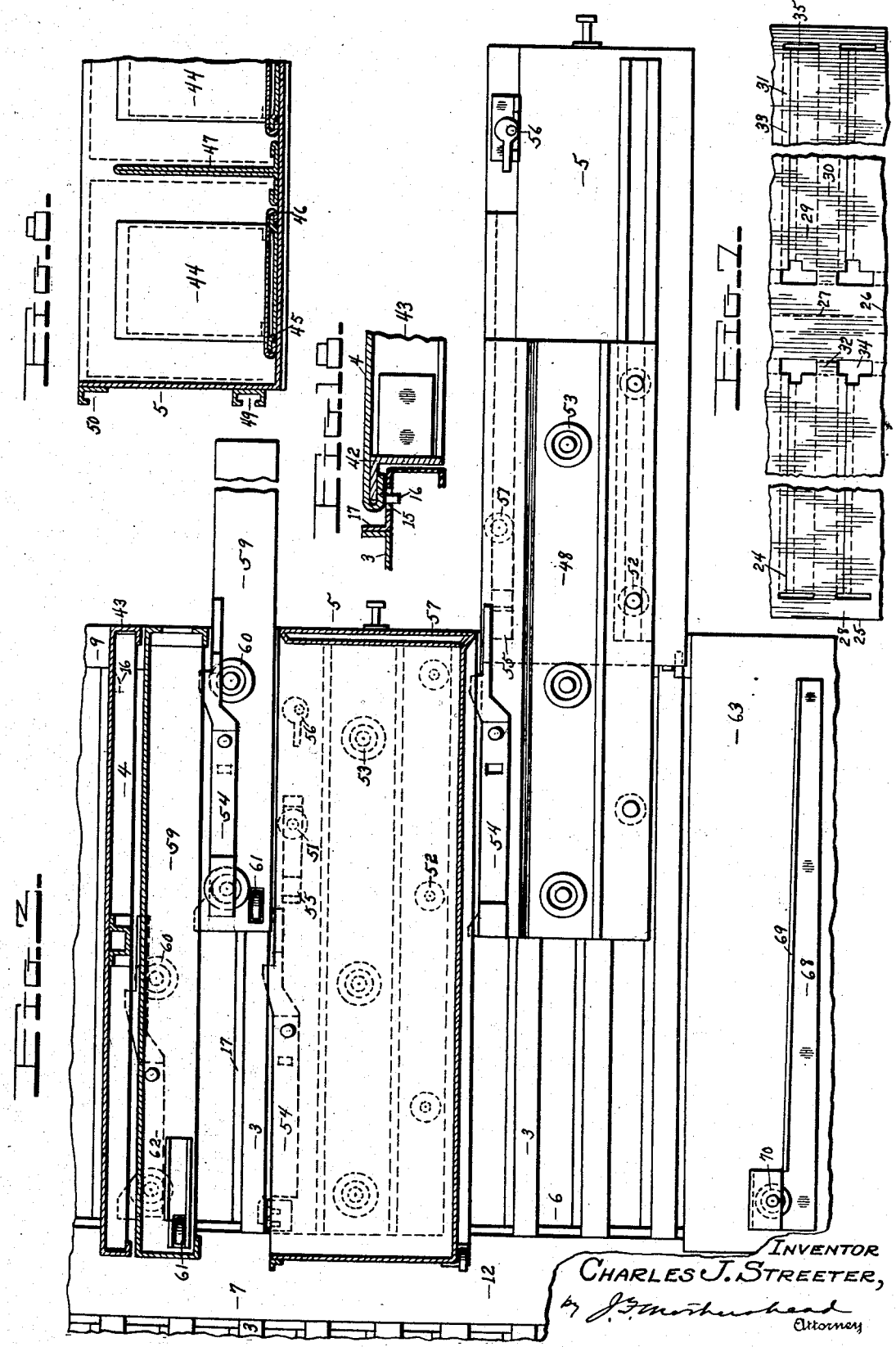
INVENTOR
CHARLES J. STREETER,
by J. G. Moorhead
Attorney

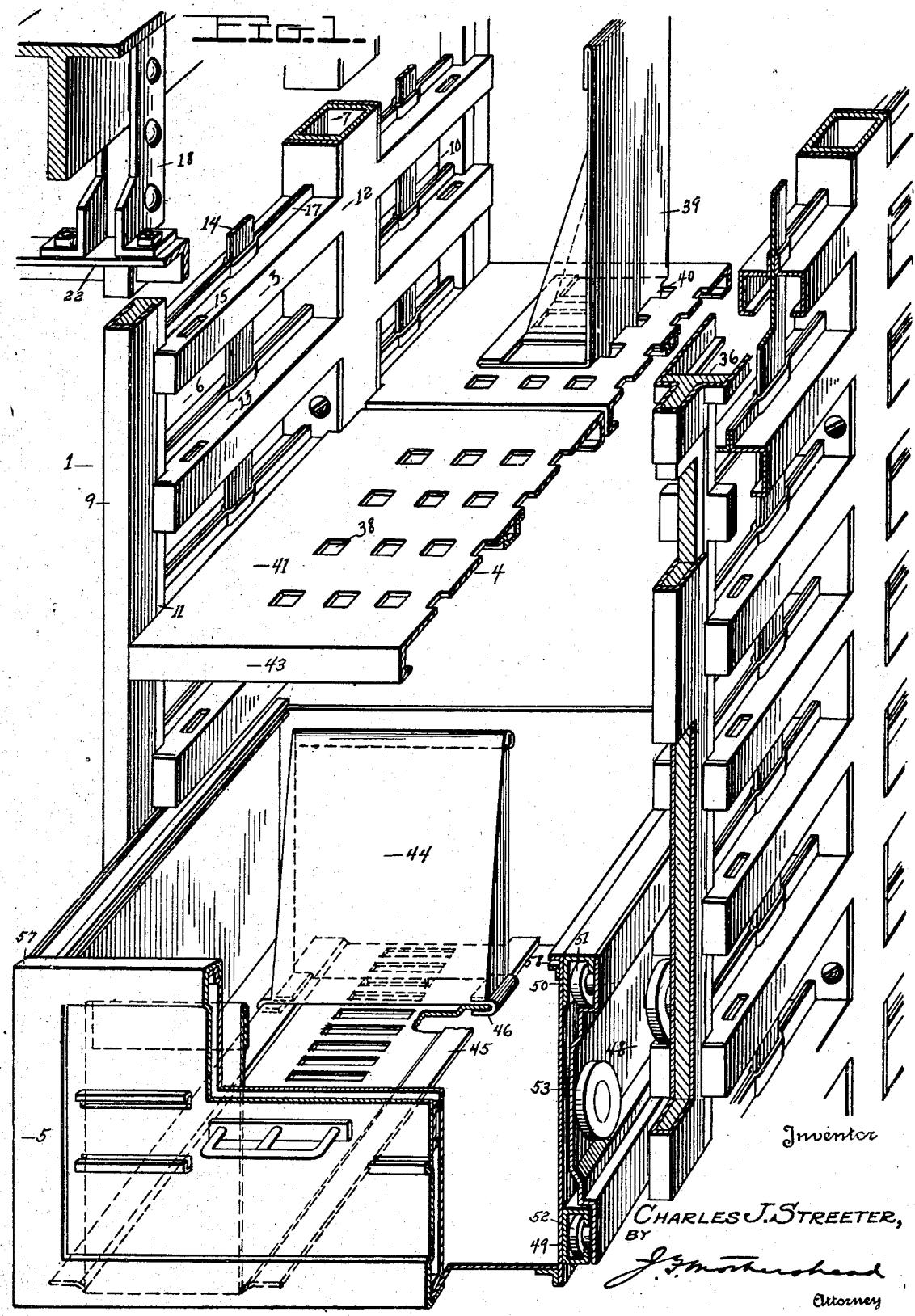

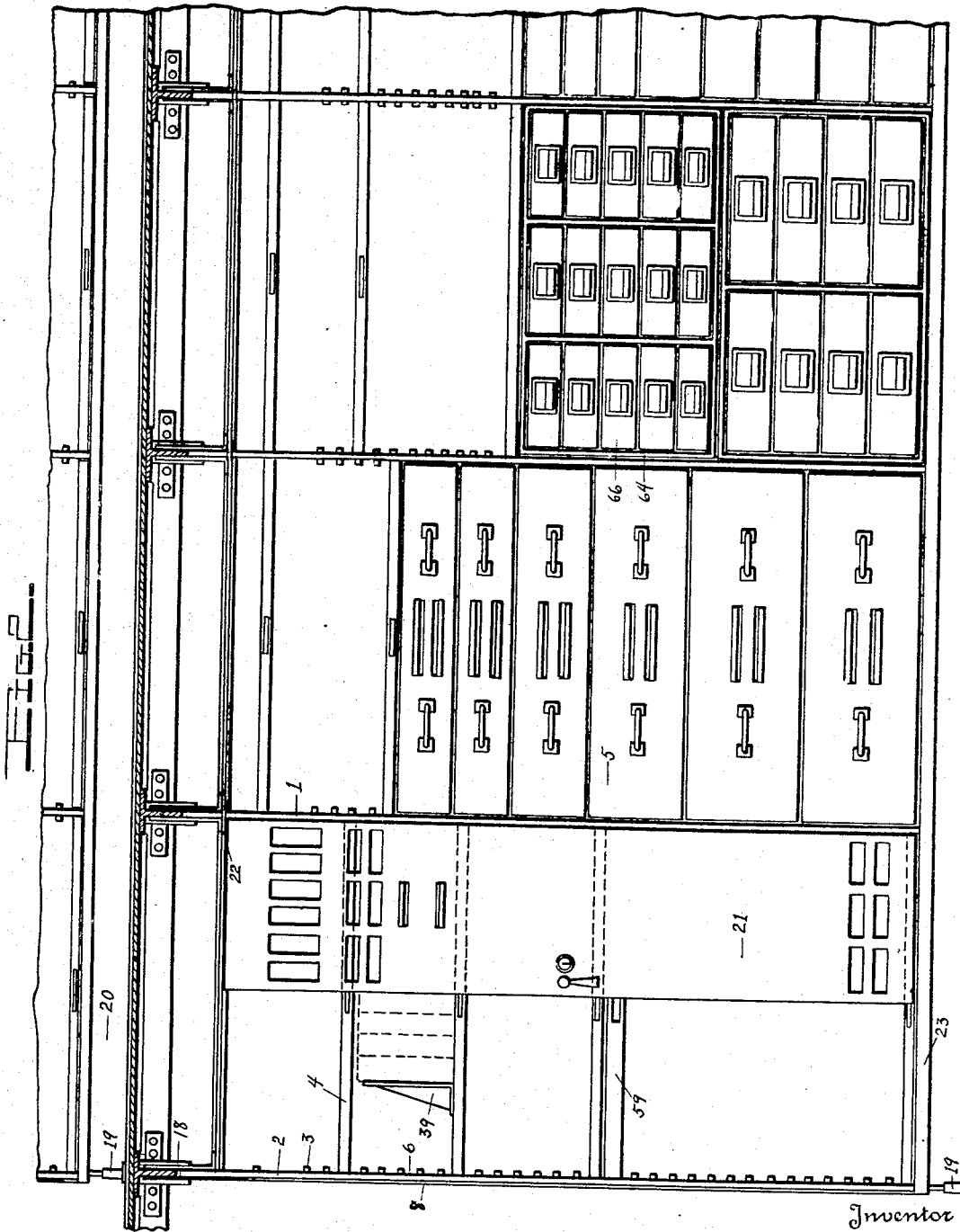

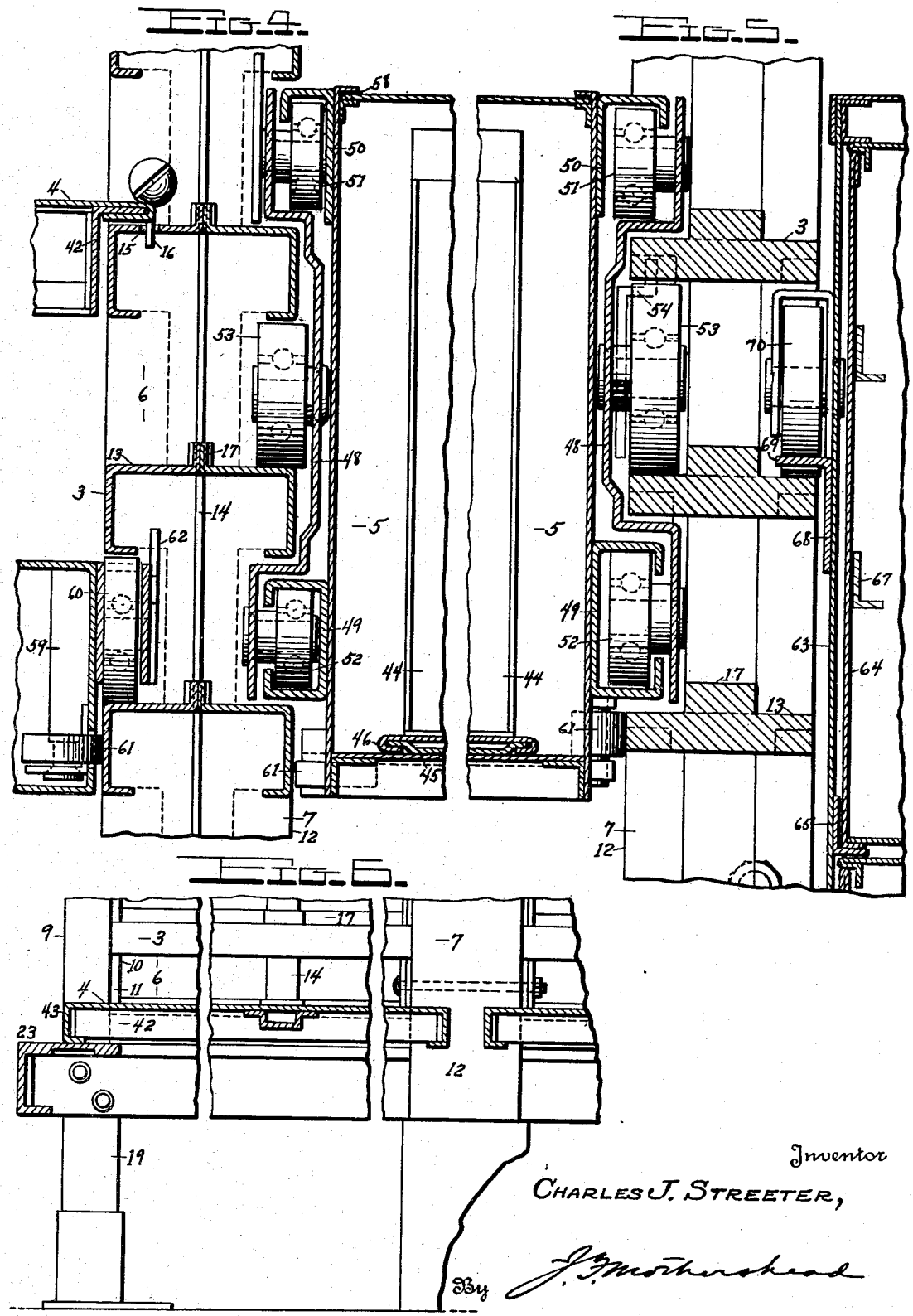

Jan. 11, 1938.　　　　C. J. STREETER　　　　2,104,912
FILING AND STACKING EQUIPMENT
Filed April 19, 1935　　　5 Sheets-Sheet 5
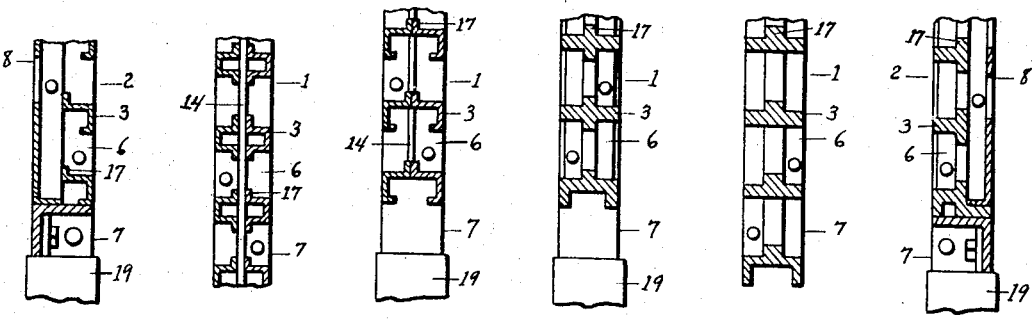
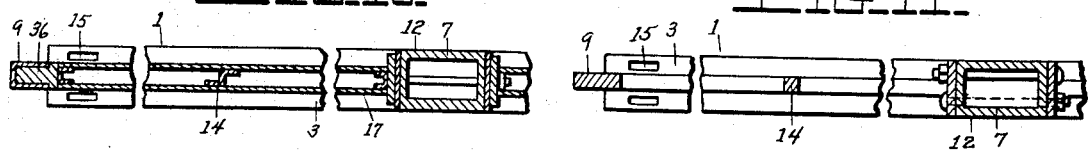
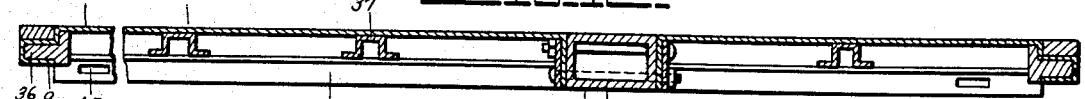
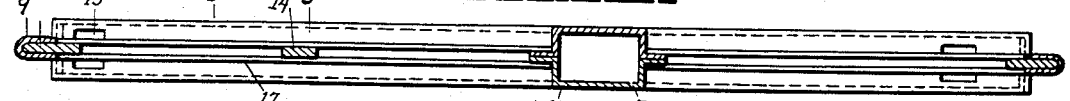
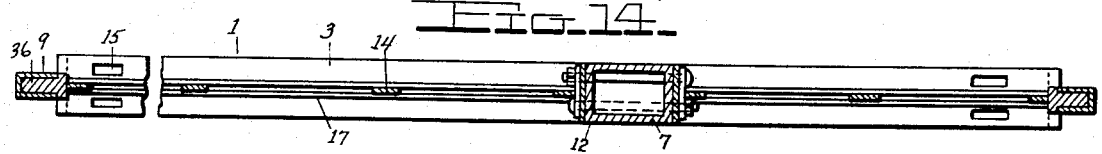
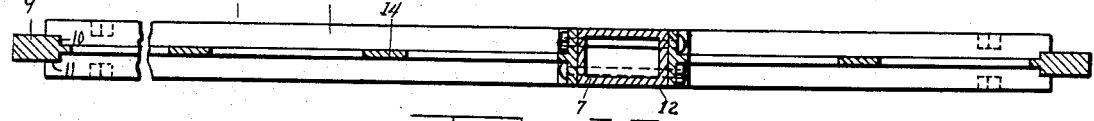
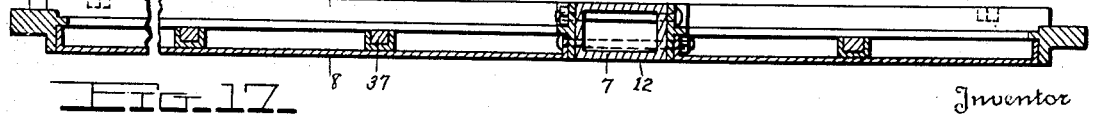
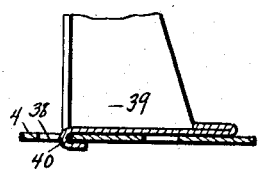
Inventor
CHARLES J. STREETER,
By J. F. Mothershead
Attorney Patented Jan. 11, 1938

2,104,912

UNITED STATES PATENT OFFICE 2,104,912

FILING AND STACKING EQUIPMENT

Charles J. Streeter, Jersey City, N. J.

Application April 19, 1935, Serial No. 17,291

13 Claims. (Cl. 312—107)

(Granted under the act of March 3, 1883, as amended April 30, 1928; 370 O. G. 757)

The invention described herein may be manufactured and used by or for the Government of the United States for governmental purposes without the payment to me of any royalty thereon.

This invention pertains to filing equipment which may be considered as combining practically all of the present so-called stock types of library, commercial and other forms of filing equipment into a single unit or series of units.

One object of this invention is the provision of filing equipment, having a framework of partitions adapted to operatively and yet removably receive a heterogeneous group of cooperating and interchangeable portable filing units, such, for example, as shelves, drawers, cases and trays of the types described and claimed in my copending application Serial Number 111,393 filed Nov. 18, 1936.

Another object of this invention is the provision of means on the partitions so spaced and arranged as to receive any one of a group of portable units and the provision of such a group of portable units as will constitute, when inserted into the framework, a multiple of the spaced means on the partitions.

A further object of my invention is the provision of partitions for filing equipment which will be most economically and readily manufactured, such, for example, as the construction of partitions, including the means for supporting and receiving the portable units, from a single and integral piece of sheet material.

Several embodiments of my invention are known to me but according to that by means of which the invention may be practiced, I provide a cabinet comprising a framework or partitions having spaced runways and a heterogeneous group of portable filing units adapted to removably ride upon the runways of the partitions when spaced to form compartments. The runways preferably extend laterally along the sides of the partitions and are preferably spaced from each other at even intervals. These vertical compartment-forming partitions and their laterally extending runways may be of any material and design. A suitable design and construction, which is an embodiment of my invention, may be the formation of a partition or framework, including the runways, from a single and integral sheet of material incised or stamped, cut and folded about reinforcing members. I further provide, and claim in my copending application Serial No. 111,393, a heterogeneous group of portable filing units, such as shelves and drawers of such design and depth as to constitute, when placed upon the runways, a multiple or a division of the spaced runways in order that they may be interchangeable, and, as such, will in no way interfere with the shelf or drawer next above or below, regardless of which of the runways they may be placed upon.

The portable filing units may also be placed on the runways so as to give any desired space between them or they may be so placed on the runways as to form an uninterrupted front or face on the compartment between adjoining partitions.

Upon the partition runways and upon the group of filing units, intended to ride upon the runways, are provided cooperative engaging means. A gravity drop-catch has been found desirable, i. e., a lug or the like on the unit to be placed upon the runways may engage slots or the like formed on the runways. The drawers may be provided with sliding or rolling members of almost any desired type to facilitate their operation upon the runways; however, an embodiment of my invention is the formation of a double-action roller and extension slide on the sides of the drawers, the construction and arrangement of which will be described hereinafter. Equipment, arrangement, and construction thereof, having the characteristics of the invention and by which the invention may be practiced is intended to be illustrated by the accompanying drawings in which—

Figure 1 illustrates a perspective view of the embodiments of my filing equipment broken away in places to show interior and cross sectional constructions and arrangements.

Figure 2 illustrates a plurality of sections, in front elevation, of assembled equipment.

Figure 3 illustrates a sectional view, in side elevation, showing shelves, drawers of varying depth, and other portable filing units.

Figure 4 is a fragmentary vertical sectional view of a partition, shelf, shelf-drawer, drawer and runway therefor.

Figure 5 is a view similar to that of Figure 4, except that it illustrates the application of cast metal runways and a sectional view of a drawer-like tray case.

Figure 6 is a fragmentary transverse view of shelves in operable position upon the runways of an upright section.

Figure 7 is a plan view of a section of a stamped, cut or incised metal sheet prior to its being formed into an upright section of the filing equipment, including the runways.

Figure 8 is a detail view in elevation of a form of compressor within a drawer.

Figures 9 to 9e illustrate sectional views in elevation of forms of runways.

Figures 10 to 16 illustrate sectional views in plan of forms of runways.

Figure 17 illustrates a sectional view, in detail, of a book end and its position with respect to a shelf.

Figure 18 illustrates, a detail sectional view in elevation of a shelf.

Referring particularly to Figure 1 in the construction of my filing equipment, I provide a plurality of upright intermediate and end partitions 1 and 2, respectively, spaced to form compartments, having a plurality of runways 3 upon which a heterogeneous group of portable filing units, such as shelves 4, drawers 5 and other articles to be described hereinafter, may removably and operably ride. An object of my invention is the spacing of the runways 3 upon the partitions 1 and 2 at predetermined equal intervals, as is indicated by character reference 6 or spacing them at a multiple of the predetermined intervals. Likewise, it is an object of my invention that the heterogeneous group of portable filing units be a multiple or a division of the spacings 6 and runways 3 when placed upon the runways.

The partitions 1 and 2 may be double as shown in Figure 1, in order that filing units may be inserted from either or both sides of the tier of compartments toward a rear or central column 7 of the partitions. In the construction of partitions 1, intermediate the ends of a range of compartments, the partition should preferably have runways extending laterally on both sides, and in the construction of a partition 2 (Figure 2, etc.) for the end of a range of compartments, it is preferable to have runways only on one side of the partition, the other side may be finished off by a sheet material panel 8, as shown in Figures 9, 9e, 12, 16, etc.

The runways 3 may be an integral part of or may be supported by a vertical member or members, such as a front post 9 and a rear or central column 7. The column 7 of course is intermediate the edge posts 9 of a double partition. These runways preferably extend laterally from the rear edge 10 and the rear sides 11 of the vertical post 9 and merge flush with the sides 12 of the vertical column 7. There is thereby furnished a clear unbroken surface free of all projecting lugs or other obstructions which may damage books, or other materials, and which permits such material to be pushed past the column and on to an adjacent shelf in the adjoining compartment in the rear. Thus, it will be understood from what has been stated that the runways commence from a position to the rear of the front edge of the post 9 and that the width of the flat surface or surfaces 13 of the runways exceeds that of the thickness of the front edge portion of the post 9, but finish flush, in width, with the width of the column 7.

An intermediate vertical reinforcing member 14 integral with the runways or not, may be interposed between the posts 9 and 7 to support the central portions of the runways.

The runways 3 are provided with means, such as lugs, holes or slots 15, preferably upon their surfaces 13, for engaging cooperative means 16 upon the portable filing units. These means are provided as gravity stops to hold the filing units in operative position upon the runways.

The portable filing units are of such size and shape as to fit substantially flush with the front edge of the post 9 when the units abut the posts 7 or when the means 15 and 16 are in engagement. The filing units, of course, are of such length as to extend from the runways of adjacent partitions which are spaced at predetermined intervals by spacer and aligning bars described hereinafter.

An upward flange 17 may be provided along the central portion of the runways to serve as a reinforcing member, a guide for the shelves and drawers and an end for shelves placed on the runways, i. e., an end for books, materials, or other articles placed on the shelves.

The majority of the weight of the framework, and articles placed in the compartments, is preferably sustained from above, as is indicated at 18, and for rigidity and placement purposes legs 19 (Figure 2) are provided at the base of the framework. These legs 19 may also serve to assist in sustaining the framework when the cabinet is heavily loaded. The compartments or range of cabinets may also be constructed so as to provide for a plurality of decks 20 as indicated in Figures 1 and 2.

Portable cabinets of the type herein described, instead of stationary, may be constructed merely by the elimination of overhead suspensions and, if desired, the substitution of a base, rollers, casters or any anti-friction element for the stationary legs 19.

Doors, such as indicated by 21 in Figure 2, for enclosing the compartment or cabinet, may also be provided. These doors may be pivotally attached to members such as 22 and 23 extending beyond the face of the cabinet as is shown in Figures 1 and 2. These members 22 and 23 attached respectively at the top and bottom edges of the partitions are preferably angle irons which extend horizontally from one partition to another and serve as means to retain the proper spacings, positions and alignments of the partitions. The base angle 23 may also serve as a guard rail to prevent injury to the equipment by trucks, etc.

The framework or partitions 1 and 2 may be manufactured of either cast, rolled or sheet material. These columns or posts 7 and 9 may be either cast material or sheet or tube steel. Columns and partitions of cast material may be cast in one piece and arranged to support the weight of additional tiers if desired. The partitions, if formed separately from the posts 7 and 9, may be bolted or otherwise secured together. See Figures 10 to 16 inclusive.

As stated, an embodiment of my invention is the formation of the framework or partitions, including the runways and spacings therebetween, from a single integral sheet of material and yet have the sheet retain its integrality when formed into the partitions and runways. A partition of this type, that is, having runways on both sides, may be formed as shown in Figure 7, by stamping or incising a sheet of material where indicated by the full lines and folded where indicated by the dotted lines at approximately 90° from surfaces within adjoining dotted lines. It will be seen that the sheet is cut through at a series of evenly spaced horizontal cuts 24 parallel with the top and bottom of the sheet. These cuts 24 start a short distance from the edge 25 of the sheet and extend almost to the vertical center of the sheet. The central uncut portion 26 of the sheet, when folded back at 90° angles along dotted lines 27 become posts 9 of the partition and the uncut marginal portions 28 merge into posts 7 of the partition. Instead of entirely forming posts 7 these portions 28 may only form a portion of the post or form a flange for attaching to the post 7. The sheet may be of double width so as to continue from the formation of post 7 to form a partition extending to the rear. Such a double partition is illustrated in Figure 1. When the sheet is folded along the remaining dotted lines, as shown in Figure 7, the portions 29 become the flat surfaces 13 of the runways; the portions 30 become the vertical edges of the runways; portions 31 become the under-surface of the runways; portions 32 the ends of the runways and portions 33 become the vertical guiding surfaces 17 centrally located on the runways between posts 9 and 7. By the removal of portions 34 and 35, which are the only waste portions of the sheet, it will be seen that the edges closely fit when folded, to form the front ends of the runways extending from the rear edges 10 and rear sides 11 of post 9. The spacings of the cuts 24 are to be determined by the desired width of runways 3 and spacings 6 therebetween.

It will be seen from the foregoing formation that the sheet may be folded about a reinforcing T-iron 36, which T-iron has had its two rear arm portions cut or punched out at intervals to form the spaces 6 between the runways which permit the engaging members of the portable units to run back on the runways. The remaining arm portions of the T-iron interiorly support the front ends of the runways. The reinforcing member 14 between posts 9 and 7 may be passed between the vertical portions 17 on the runways and spot welded or otherwise secured together. If a separately constructed column is employed, instead of column 7 formed integrally within the partition, the sheet metal assembly just described or cast metal runways may be secured to such a column by bolts, or otherwise. This alternative construction and arrangement is shown in Figure 10.

Slightly different designs of sheet metal partitions are shown in Figures 1, 4, 9, 9a, 9b, 10 and 12 to 14. These designs, however, are of similar purposes and functions, the only particular difference being the type and shape of reinforcing members (36, 14 and 7) for the sheet metal partitions. For example, the reinforcing member 36 or post 9 in Figures 1, 10 and 12 to 14 have varying shapes. The reinforcing members 14 of these figures also are of varying types and shapes. These modifications will be clearly understood from a study of these figures.

The sheet metal partitions 2 at the range ends, shown in Figures 9 and 12, are built up in very much the same manner as the intermediate partitions 1, except that only one-half of sheet is cut and stamped as in the intermediate partitions. The portion of the sheet forming the end panel 8 of the partition 2, Figures 9 and 12, is left plain and only such cutting or stamping as may be necessary for ventilation, design or other desired features is done. This end panel portion may be bent to fit the posts 9 and 7 as desired, the inside of the end panel of partitions 2 may be reinforced by some appropriate reinforcing and securing members 37.

Intermediate partitions 1 of cast material, while slightly different in design and construction than sheet metal due to the different characteristics of the material, are designed to accomplish the same results as sheet material partitions. The function and operation of the portable units upon the runways of the cast material partitions are similar and may be interchanged from sheet material compartments to cast material compartments. Modified forms of cast material partitions are shown and will become obvious from the study of Figures 5, 9c to 9e, 11, 15 and 16. These partitions may be cast in one piece, with runways and vertical reinforcing portions, and may be included in central columns 7 or may be secured thereto as shown.

The range end partitions 2 of cast metal are similar to the intermediate partitions 1, except that the runways are omitted on one side, as shown in Figures 9e and 16. A sheet metal panel 8 may be secured to the cast metal reinforcements 37 or the range end partition may be cast to form a panel on one side.

In order to more fully understand the objects, functions, and operations of the structures described and claimed herein, it becomes necessary to also describe herein the portable filing units, described and claimed in my copending application serial number 111,393, which are adaptable for use in combination with said structures. The shelves 4 are preferably constructed of sheet material and are provided with uniformly spaced means 38, such as holes, for interchangeably and yet operably, engaging book ends, rests, or compressors 39 having means 40, such as hooks or lugs for engaging the shelf at almost any desired position. Details of shelves and book ends of preferred construction are shown in Figures 1, 6, 17 and 18. The cooperative book ends, compressors and the like, 39, are preferably of sheet metal. The particular design and construction of the shelves and their cooperative accessories will become apparent upon the study of the figures mentioned which illustrate a shelf constructed of sheet metal, the sheet forming the surface portion 41 is bent back underneath itself at the shelf ends and embraces an angle iron 42. The surface portion also continues downward into side portions 43, substantially the width of a runway, and thence inward. The angle iron 42, as shown in Figure 18, continues within the ends of the shelves to where it abuts the downward edge portion 43. At this point the horizontal flange of the iron 42 is removed and the vertical flange is bent at a right angle and secured to the inner face of the side edge portion 43. The lug 16 projects downwardly at right angles to the horizontal flange of the angle iron 42. The drawers 5 are provided with card or document rests and compressors 44 as shown in Figures 1 and 8. The drawers are also provided with uniformly spaced means 45, such as keepers or guides for operably engaging means 46, such as guideways, provided on the compressors. The keeper 45 within the drawer may terminate a sufficient distance from the front end of the drawer to permit the removal or interchangeability of compressors merely by sliding the guideways 46 off the end of the keeper or guide 45; or, if desired, the keepers may be removable from the drawers, as shown in Figure 1. In this way a plurality of compressors may be employed upon the guides and, too, a plurality of guides or keepers 45 may be evenly spaced within the drawer to provide for compressors of a multiple length or to accommodate single length compressors adjacent the ends of each other, such as illustrated in Figure 8. In addition, there may be inserted upon these keepers 45 such accessories as partition 47, illustrated in Figure 8. The details of construction of these elements will also become apparent from the study of these figures.

Referring now to the means upon the drawers 5, Figures 1, 3, 4 and 5, to facilitate their operations upon the runways 3 and to support the drawers when in extended position: as shown in these figures the drawer is equipped with a specially designed suspension 48 which will permit full extension of the drawer. This suspension, complete, is operably attached to the drawer side so that when the drawer is removed from the compartment the suspension 48 is also removed, leaving the runways entirely clear and free of obstruction so that any other filing unit may be run back in place into the compartment. Channel-shaped drawer supports 49 and the angle-shaped support 50 are provided as keeper for rollers 51 and 52. These keepers 49 and 50 are attached in a fixed position on the drawer side and the rollers 51 and 52 are carried by the suspension member 48. The drawer transfers its weight, through the keeper 49, to rollers 52, and from these rollers through the suspension member 48 to the main rollers 53, which are attached to the suspension member 48. The main rollers 53 ride or operate upon the runways 3. Rollers 51 operate in the keeper 50 primarily as a guide and to facilitate operation of the drawer by preventing a binding of elements when the drawer is suspended.

Suitable means 54, such as a pivoted gravity or spring catch, may be provided on the suspension member 48 for engaging stopping means on the runways (see Fig. 5) to stop the advance of the suspension member 48 after it has been withdrawn from the compartment by the drawer substantially half its length, as shown in Figure 3. Means for stopping the advance of the drawer from the suspensions 48, when the drawer has reached a predetermined open position, may also be provided. Means for this purpose are shown in Fig. 3 as an angle bracket 55 provided on the suspension member 48 which is engaged by a lug or stop 55a, shown in Figure 3, provided on the drawer within the angle-shaped keeper 50 at its rear end. Such means as a levered eccentric grip lock 56 pivotally attached to the drawer may be provided to engage and hold the suspension member in a position substantially flush with the ends of the drawer when removed entirely from the compartment and in non-use. Rollers 52 and 53 may be provided at intervals along the suspension member to insure a uniform operation and rollers 51 may be so positioned as to prevent binding regardless of the position of the drawer. When the drawer is being closed, its facial flange 57 pushes the suspension member 48 back into the cabinet in a telescopic fashion along the side of the drawer.

Depending upon the depth of the drawer, the telescopic members 49, 50 and 48 may be so spaced as to fit within the spaces 6 between the runways and the rollers 53, which operate upon the runways 3, may be so arranged as to carry the drawer in a correct position upon the runways, that is, so that the drawer will only occupy a multiple of the runways and the spaces therebetween.

The drawers may also be provided with sliding or hinged lids (not shown) so as to have the material within the drawer completely enclosed even when it is removed from the compartment. For this purpose the drawer may be provided with inner side wall grooves 58, (Figure 1). The drawer may also be provided with ventilator if desired.

Another filing unit used in connection with my invention is a shelf 59 shown particularly in Figures 3 and 4. This type of shelf is provided with rollers 60 and 61 to facilitate their operation. Means 62 such as the catches 54 on the drawers 5 may be provided on this type of shelf for engaging the runways 3 so as to stop the shelf when withdrawn approximately one-half of its width.

These shelves 59 are intended for working and reference tables in an extended position. Even though heavily loaded they operate easily upon rollers. Rollers 60 are adapted to carry the weight while rollers 61 are adapted to prevent a binding between the shelf and the upright. Similar rollers 61 may be provided on the sides of the drawers 5.

Another filing unit used in connection with my filing equipment is an open-faced drawer 63 (Figures 2, 3 and 5) which is adapted to carry a plurality of trays 64 upon brackets or angle irons 65 on the inner walls of the drawer. Or if desired the tray 64 may also be open-faced and employed as a tray case. The tray cases 64 may, in turn, be adapted to carry a plurality of trays 66 (Figure 2). The trays may be provided with hinged or slide lids (not shown) if desired. In the use of this unit, a single tray 66 may be removed; the large tray 64, or tray case 64 with the trays 66 therein, may be removed; or the entire drawer 63 carrying the cases and/or the trays may be removed.

This drawer 63 is provided with an angle iron 68 along its outer sides preferably positioned so as to slightly decline toward the front of the shelf (see Figure 3).

The horizontal leg 69 of the angle iron 68 being adapted to support the drawer 63 on the runways 3. This affords a frictional engagement between the drawer support and the runways for the purpose of preventing the drawer 63 from being pulled outwardly by the withdrawal of either the tray cases 64 or the trays 66. The brackets 65 likewise create a friction between the tray case 64 and the drawer 63 which prevents the tray case from being pulled outwardly by the withdrawal of a tray 66.

The forward declining runway engaging flange 69 is so positioned in order to facilitate the operation of the drawer in an outward direction from the compartment. Rollers 70 are provided at the rear of the sides of the drawer so that if the drawer is slightly raised at the front it may be easily rolled back into the compartment. If desired, a catch similar to that of 54 on the drawers 5 may be provided to stop the case or drawer when pulled out a certain distance from the compartment.

The detailed construction of the shelves 59 and drawers 63 will become apparent, it is believed, upon the study of Figures 2, 3, 4 and 5.

It will be understood from the foregoing that various modifications may be adaptable and yet come within the scope of my invention as set forth in the appended claims. It is to be further understood that I hereby reserve the right to file divisional applications for features of novelty herein described which may constitute subject matter of separate applications.

Having described my invention, what I claim is:

1. Filing and stacking structure comprising two or more partitions each formed with vertical side members and a centrally located vertical column member, means extending upwardly from said partitions for suspending the same, spacing members connecting adjacent partitions, filing units, supporting members for said filing units extending laterally from said side members and terminating flush with the side of said central column, and means on the supporting members for detachably engaging said filing units.

2. In filing and stacking equipment having a plurality of terminal and intermediate upright suspended sections for the support of filing units, sections of the class described each having a vertical bar member and a vertical column member connected by separated runways extending laterally from a point rearward of the outermost edge of said bar member and terminating in one side and flush with another side of said column member, filing units cooperatively engaging the runways of adjacent sections, and spacer bars connecting and aligning said sections.

3. A cabinet having filing unit supports comprising an incised metal sheet folded to form vertical members continuing into a plurality of spaced laterally extending runways having substantially horizontal surfaces continuing into substantially vertical sides and ends for said runways.

4. A cabinet having filing unit supports comprising an incised metal sheet folded about vertical reinforcements to form vertical members connected horizontally by a plurality of spaced laterally extending runways having substantially horizontal surfaces continuing into substantially vertical sides and ends for said runways.

5. Upright members of filing and stacking equipment comprising column and side members and horizontal runways formed of an incised and folded sheet of metal, said side and column members being interiorly reinforced, said sheet of metal forming vertical side members and a centrally located column connected by separated horizontal runways extending laterally from a point rearward of the outer edge of said vertical side members and terminating in one side of said column and flush with another side of said column.

6. An upright section for filing and stacking equipment comprising a centrally located column member, vertical side members and spaced horizontally disposed runways integral with said column and side members and adapted to support filing units, said runways joining the side members in spaced offsets inward of the outermost edges of the side members and joining said column member at one side thereof and flush with another side thereof.

7. An upright for filing and stacking equipment having vertical side members and horizontal runways for operably supporting filing units, said side members being formed of vertically positioned T-shaped bars having their leg portion outermost and lying in substantially the same plane with their arm portions transversely thereof, said arm portions having intermittent portions thereof removed to thereby form openings through which runway-engaging members on said filing units may pass, the remaining portions of said T-arms forming end supports for the runways.

8. An upright for filing and stacking equipment having side members and a centrally located column intermediate the side members connected by runways for filing units, said side members being formed of vertical T-shaped bars having their arm portions innermost and transverse of the upright, said arm portions having recesses formed therein adapted to receive engaging members of filing units, the remaining portions of said arms forming the end portions of said runways.

9. Filing and stacking equipment comprising vertical side members and a centrally located column member, horizontally disposed equally spaced runways connecting said vertical members, and adapted to support filing units, said runways extending laterally from said side members rearward of their outermost edges and terminating at one of the sides of said column member and flush with another side thereof.

10. An upright section of filing and stacking equipment comprising a front edge bar portion having spaced lugs projecting laterally from the rear portion thereof, runways extending laterally from said bar and rearwardly from said lug portions, and a rear support for said runways, said lugs forming closed ends and supports for said runways.

11. Filing and stacking equipment comprising vertical side members and a centrally located column member, horizontally disposed equally spaced runways connecting said vertical members and adapted to support filing units, said runways extending laterally from said side members rearward of their outermost edges and terminating at one of the sides of said column member and flush with another side thereof, and filing-unit guideways contiguous with said runways between said column and side members, to prevent lateral displacement of movable elements.

12. An upright section of filing and stacking equipment comprising a front edge bar portion having spaced lugs projecting laterally from the rear portion thereof, runways adapted to support filing units extending laterally from said bar and rearwardly from said lug portions, a rear support for said runways, said lugs forming closed ends and supports for said runways, and means contiguous with said runways adapted to serve as guides to prevent lateral displacement of filing units.

13. A cabinet having filing unit supports comprising an incised metal sheet folded to form vertical members continuing into a plurality of spaced laterally extending runways having substantially horizontal surfaces continuing upwardly into a substantially vertical flange and continuing downwardly into substantially vertical sides and ends for said runways and terminating into a horizontal flange adapted to serve as a guideway and bearing surface for movable elements.

CHARLES J. STREETER.